No. 827,927. PATENTED AUG. 7, 1906.
H. D. B. LEFFERTS.
PNEUMATIC TIRE.
APPLICATION FILED NOV. 17, 1905.
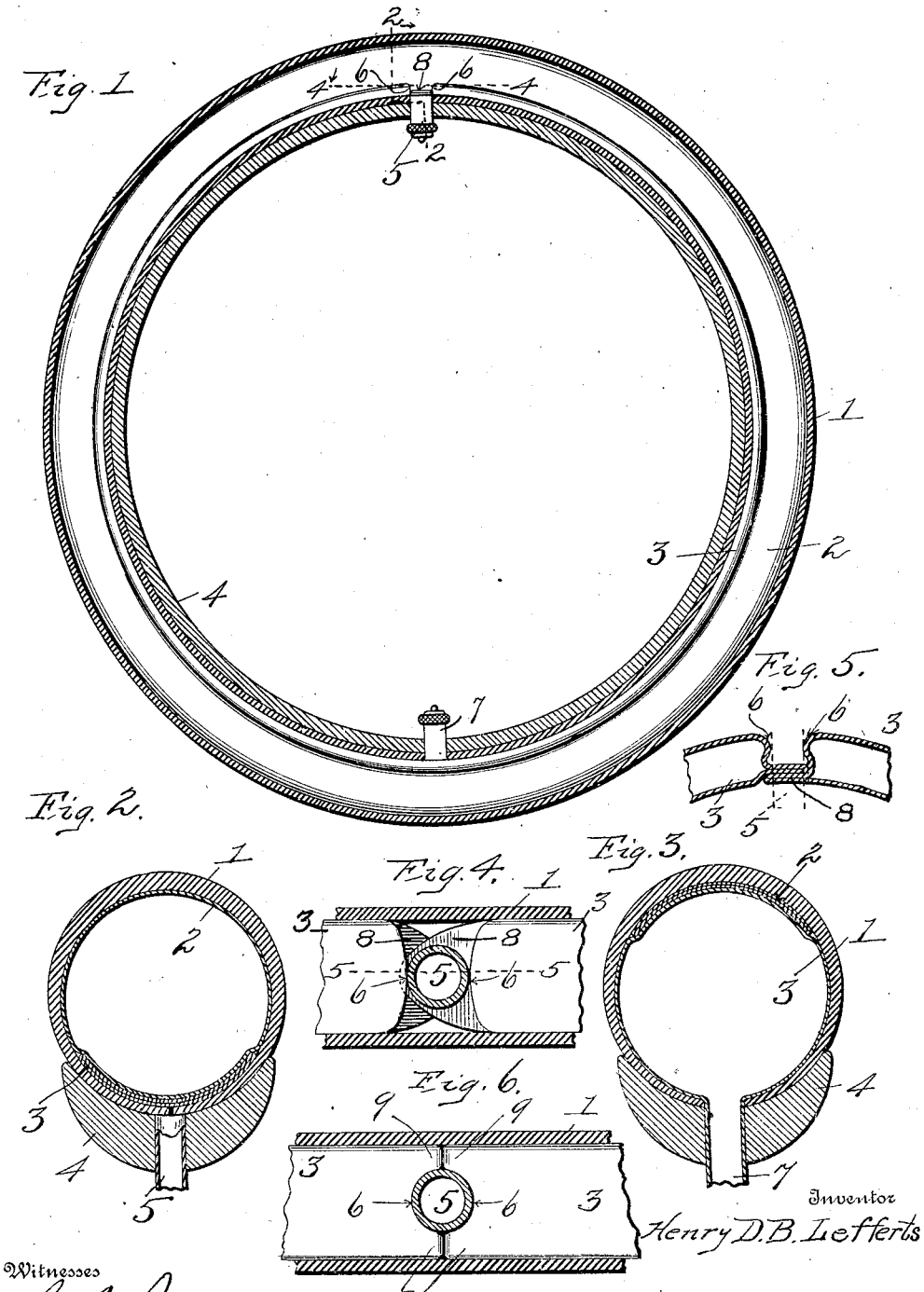
Witnesses
C. B. Lane
R. C. Braddock
Inventor
Henry D. B. Lefferts
By D. T. Wolhaupter
Attorney

UNITED STATES PATENT OFFICE.

HENRY D. B. LEFFERTS, OF ORANGE, NEW JERSEY.

PNEUMATIC TIRE.

No. 827,927.     Specification of Letters Patent.     Patented Aug. 7, 1906.

Application filed November 17, 1905. Serial No. 287,805.

*To all whom it may concern:*

Be it known that I, HENRY D. B. LEFFERTS, a citizen of the United States, residing at Orange, in the county of Essex and State of New Jersey, have invented certain new and useful Improvements in Pneumatic Tires, of which the following is a specification.

This invention relates to vehicle-tires of the pneumatic type, and has special reference to that class of pneumatic tires embodying an inner inflatable distending-tube within the outer casing, or "outer tube," as it is commonly termed.
To this end the invention contemplates a simple and practical construction of pneumatic tire possessing special utility for motor-vehicles and comprising means for not only securing a maximum cushioning effect, but also greatly facilitating the repair of the tire in the event of injury thereto.

It is well known that the tires of motor-vehicles are subjected to exceedingly hard usage and have imposed thereon heavy shocks and blows from various angles or directions, particularly when the vehicle is speeded over a roadway. Under such conditions injuries to the main inner distending-tube of a tire are quite frequent and easily occur, with the result of immediately putting the vehicle out of service and causing considerable delay and expense for the repair of the tire. With this difficulty in view the present invention contemplates a construction of pneumatic tire wherein an increased body of rubber is provided for within the main outer casing to secure considerable solidity and a maximum cushioning effect. At the same time the invention also provides means within the outer casing for immediately distending the same to its original form and size under pneumatic pressure in the event of partial or complete damage to the main inner distending-tube.

In connection with the above the invention, further, has in view a novel and practical means of assembling and holding in properly-assembled relation a main inner distending-tube and a supplemental inner reserve tube, both of which are inflatable under pneumatic pressure.

Also the invention contemplates effective means for holding the two inner tubes properly positioned and interlocked when the main inner tube is collapsed and the supplemental reserve tube is distended.

With these and other objects in view, which will more readily appear as the nature of the invention is better understood, the same consists in the novel construction, combination, and arrangement of parts hereinafter more fully described, illustrated, and claimed.

The essential features of the invention involved in carrying out the objects above indicated are necessarily susceptible to structural change without departing from the scope of the invention; but a preferred embodiment thereof is shown in the accompanying drawings, in which—

Figure 1 is a circumferential or longitudinal sectional view of a pneumatic tire embodying the present invention. Fig. 2 is a cross-sectional view on the line 2 2 of Fig. 1, showing the main inner tube inflated and the supplemental tube deflated. Fig. 3 is a similar view showing the reverse condition—that is, showing the main inner tube deflated and the supplemental tube inflated. Fig. 4 is a detail sectional view on the line 4 4 of Fig. 1, illustrating the temporary tube-holding means for retaining the ends of the supplemental tube properly positioned when the latter is deflated. Fig. 5 is a detail sectional view on the line 5 5 of Fig. 4, showing the supplemental tube partly inflated to better illustrate the holding means. Fig. 6 is a view similar to Fig. 4, showing the interlocking action of the supplemental tube when the same is inflated.

Like references designate corresponding parts in the several figures of the drawings.

In carrying out the invention one of the distinctive features thereof resides in the fact that no material changes are required in the usual construction of inner-tube tire to which the improvement may be applied. It is thus possible to adapt the invention to any pneumatic tire of the inner-tube type irrespective of the manner in which such tire is applied to the rim or felly. Also it is to be understood that the improved construction of the tire is not only applicable to wheels of motor-vehicles, but also to bicycles and carriages and wagons generally.

Referring particularly to the construction contemplated by the present invention, the improved pneumatic tire essentially comprises in its organization the main outer casing 1, an inflatable main inner distending-tube 2, and an inflatable supplemental inner reserve tube 3, which parts are assembled in operative relation and placed upon a wheel-rim 4 in any suitable or approved manner.

Preferably the main inner distending-tube 2 is of the common continuous type and is of such a capacity and size that when fully inflated it provides for the complete distension of the outer casing of tube 1. As usual, the main inner tube is arranged wholly within the outer casing 1 and extends entirely around the same, and at a convenient point the said tube 2 has fitted thereto an inflating-valve stem 5 in communication with the interior of the tube 2 and extending inwardly from the wheel-rim 4 to a point where convenient access may be had thereto for inflating and deflating purposes.

An important feature of the invention resides in the special arrangement of the supplemental inner tube 3 with relation to the main inner tube and the wheel-rim. It is to be observed by reference to the drawings that the said supplemental tube lies wholly without the main inner tube and is interposed between the inner side of the latter and the wheel-rim or the portion of the outer casing next to the wheel-rim, according to the type of tire being used. Furthermore, the supplemental inner reserve tube 3 is of a divided construction and is arranged with its separate end portions 6 disposed upon opposite sides of the valve-stem 5 for the main inner tube and held in close abutting relation to said stem, as may be plainly seen from Figs. 1, 4, 5, and 6 of the drawings.

At a convenient point the supplemental reserve tube 3 has fitted thereto an inflating-valve stem 7 entirely independent from that of the inner tube, but likewise projecting inwardly through the wheel-rim 4 in the well-known manner. It is preferable to locate this inflating-valve stem 7 diametrically opposite the holding means for the ends 6 of the tube, thus materially assisting in securing such tube always properly positioned and preventing creeping thereof either when inflated or deflated.

It is also preferable to provide temporary holding means for retaining the ends of the supplemental tube in abutting relation upon opposite sides of the valve-stem 5 when said supplemental tube is deflated. This may be accomplished by vulcanizing together a sufficient portion of the ends of the supplemental tube, as at 8, to form holding-ears provided therein with holes or perforations receiving the valve-stem 5. This may be plainly seen in Figs. 4 and 5 of the drawings.

While the holding-ears 8 constitute temporary holding means for the ends of the tube 3 when deflated, it is essential to properly secure these ends with relation to the valve-stem 5 when the main inner tube is collapsed and the supplemental tube inflated. To this end the invention contemplates as one of the distinctive features thereof the idea of interlocking by inflation the ends of the supplemental inner tube about the valve-stem 5. This result is effected by constructing the two inflatable tubes respectively of different inflatable diameters. While the extent of rubber in the two tubes is practically the same, still in the practical manufacture of the tire the inner reserve tube 3 is constructed of a greater inflatable diameter than the main inner tube 2. Hence when the latter is deflated and the supplemental tube inflated the latter not only serves to fully distend the outer casing, but at the same time sufficient distension is provided for to permit the ends of the inner tube to extend about the valve-stem 5 to form inflated holding-hooks 9.

The construction described is quite important, for the reason that when the main inner tube is deflated or collapsed by reason of injury the same constitutes a loose body of rubber within the outer casing. This body of rubber, especially at the valve-stem portion 5, which is lifted into the outer casing by the inflation of the tube 3, would be easily shifted about or deranged under severe and sudden shocks if the same were not securely held to the supplemental tube 3. It will be observed that the construction described provides effective means for thus securely holding the main inner tube when the same is deflated, even though the valve-stem 5 is so short as to be drawn entirely through the holding-ears 8.

When the tire is under normal working conditions with the main inner tube inflated, the supplemental tube 3 is deflated and acts as a cushion next to the rim. Precisely the reverse condition prevails in the event of injury to the main inner tube which necessitates the inflation of the supplemental inner tube. When this occurs, the deflated main inner tube, as shown in Fig. 3, provides a thickened cushioned tread portion of the tire.

From the foregoing it is thought that the construction, operation, and many advantages of the herein-described tire will be readily apparent without further description.

Having thus described my invention, what is claimed, and desired to be secured by Letters Patent, is—

1. A pneumatic tire comprising an outer casing, a normally inflated main inner tube having an inwardly-projecting valve-stem, and a normally deflated divided supplemental reserve tube arranged without the main inner tube and having its ends disposed in abutting relation to the valve-stem, said supplemental reserve tube being of a greater inflatable diameter than the main tube to provide, when inflated, inflated holding-hooks extending about the said valve-stem.

2. A pneumatic tire comprising an outer casing, a normally inflated main inner tube having a valve-stem, and a normally deflated divided inner reserve tube having its ends disposed against said valve-stem, said supplemental reserve tube being of a greater inflatable diameter than the main inner tube and provided at its contiguous ends with offstanding holding-ears projecting from one side of the tube ends and arranged to receive the said valve-stem of the main inner tube, said reserve tube, having, when inflated, inflated holding-hooks engaging about said valve-stem.

In testimony whereof I affix my signature in presence of two witnesses.

HENRY D. B. LEFFERTS.

Witnesses:
E. P. LEFFERTS,
G. C. LEFFERTS.